United States Patent [19]

Szajna et al.

[11] Patent Number: 4,565,516

[45] Date of Patent: Jan. 21, 1986

[54] MOLD FOR LARGE CAPACITY CONTAINERS

[75] Inventors: John L. Szajna, Norridge; Harry Weissenstein, Woodridge, both of Ill.

[73] Assignee: Continental Plastic Containers, Inc., Stamford, Conn.

[21] Appl. No.: 590,316

[22] Filed: Mar. 16, 1984

[51] Int. Cl.⁴ .............................................. B29C 5/10
[52] U.S. Cl. .................................... 425/540; 264/523; 425/451
[58] Field of Search ............... 425/532, 539, 540, 180, 425/450.1, 451, 588, 182, 330; 264/543, 523

[56] References Cited

U.S. PATENT DOCUMENTS

| Re. 27,155 | 7/1971 | Hansen | 425/532 |
| 2,784,452 | 3/1957 | Ruekberg et al. | 425/539 |
| 3,032,809 | 5/1962 | Willard | 425/532 |
| 3,519,705 | 7/1970 | Pannenbecker | 425/532 |
| 3,543,339 | 12/1970 | Stefaniak | 425/540 |
| 4,005,966 | 2/1977 | Nutting | 425/539 |

*Primary Examiner*—Willard E. Hoag
*Assistant Examiner*—James C. Housel
*Attorney, Agent, or Firm*—Charles E. Brown

[57] ABSTRACT

This relates to a blow mold of a large capacity which is particularly configured to replace two adjacent blow molds in a blow molding machine of the Ferris wheel type. The blow mold includes an inner mold half which will bridge the supports for two existing smaller molds and an outer mold half which is formed in two segments with each of the segments being independently mounted on the supports for two separate prior radially outer blow mold halves. Thus, an existing machine may be readily converted to make much larger blow molded articles then those for which it was originally intended. This abstract forms no part of the specification of this application and is not to be construed as limiting the claims of this application.

5 Claims, 3 Drawing Figures

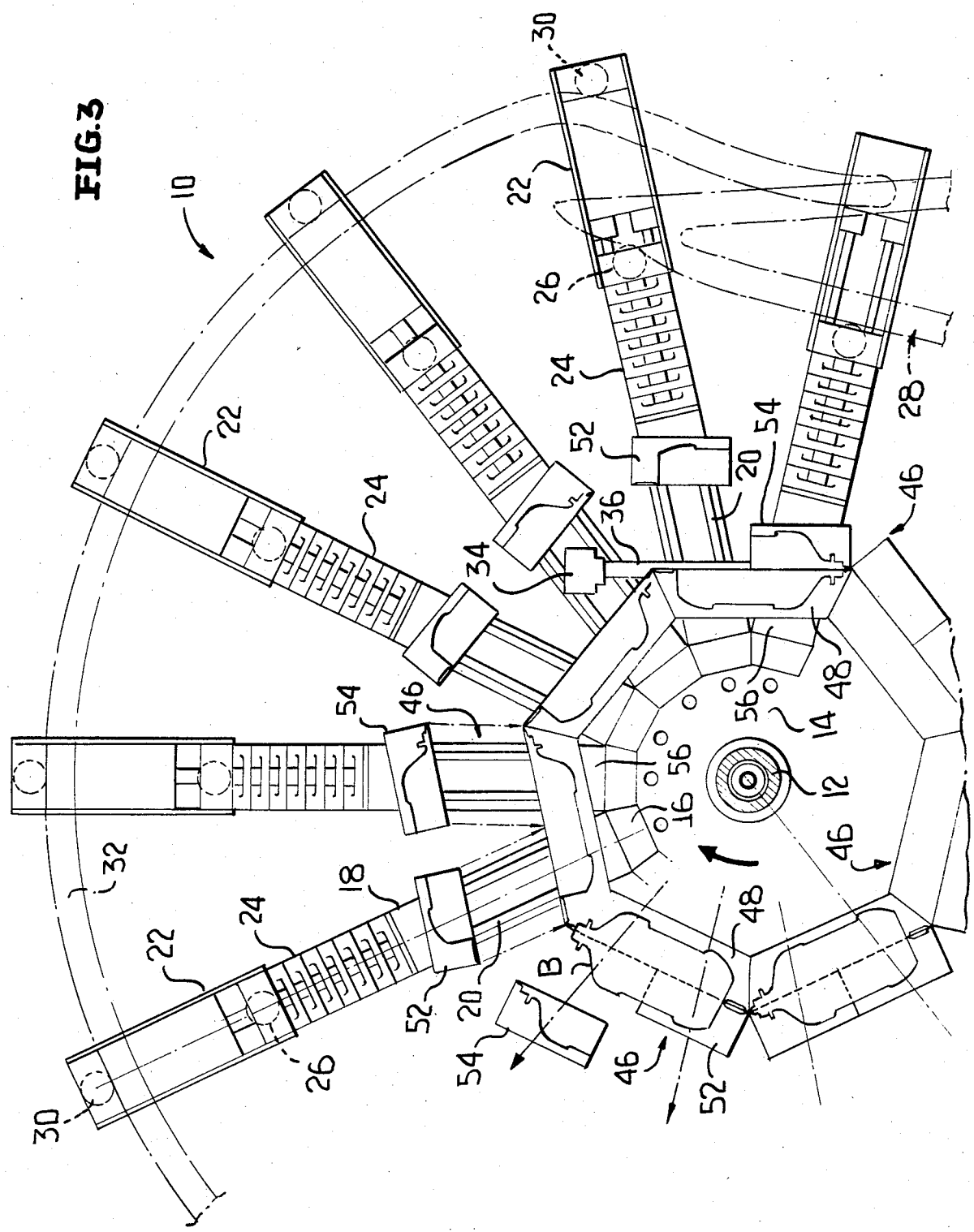

MOLD FOR LARGE CAPACITY CONTAINERS

This invention relates to a mold for large capacity container which is of a construction to replace two existing small molds on an existing blow molding machine of the Ferris wheel type.

There have been in existence for many years blow molding machines of the Ferris wheel type wherein there is a radially inner fixed support for each radially inner mold half and a radially outer movable support for each associated radially outer mold half. These blow molding machines receive an extruded tube parison and clamp a section thereof when the molds close. Thereafter, an intended article is blow molded within the closed molds. At the termination of the blow molding operation, the radially outer mold half is moved radially outwardly away from the radially inner mold half, taking with it the blow molded article which is then ejected and passes down a chute away from the blow molding machine. After the radially outer mold half has moved circumferentially beyond the extruded tube parison, it again moves radially inwardly and cooperates with its respective fixed inner mold half to clamp the parison and to initiate the blow molding operation. Such a blow molding machine is disclosed in U.S. Pat. No. 2,784,452 to Ruekberg and Szajna, granted Mar. 12, 1957.

A large number of such Ferris wheel type blow molding machines are available, and it is now desired to blow mold larger articles than those for which the blow molding machines were originally designed. In this particular instance, it is desired to blow mold containers of a much larger capacity than those which have been previously blow molded on an existing blow molding machine.

In accordance with this invention, there has been developed a blow mold for a blow molding larger than intended articles, including containers, which blow mold replaces two existing molds. The new mold includes a fixed inner mold half of an axial extent to replace two prior adjacent fixed inner mold halves. In lieu of having a conventional one-piece outer mold half, the new mold has an outer mold half which is formed of two segments with each segment being mounted on the movable radially outer support of the blow molding machine for independent radial movement and each segment replacing an outer half of an existing mold.

In accordance with this invention, the segments of the outer mold half of the new mold are independently movable relative to both the fixed mold half and each other.

With the above and other objects in view that will hereinafter appear, the nature of the invention will be more clearly understood by reference to the following detailed description, the appended claims, and the several views illustrated in the accompanying drawings.

IN THE DRAWINGS

FIG. 3 is a fragmentary elevational view of a portion of a conventional blow molding machine wherein blow molds in accordance with this invention have replaced two adjacent blow molds previously utilized in conjunction with the blow molding machine, and shows the manner in which the segments of the outer mold half are independently movable.

Figure 1:
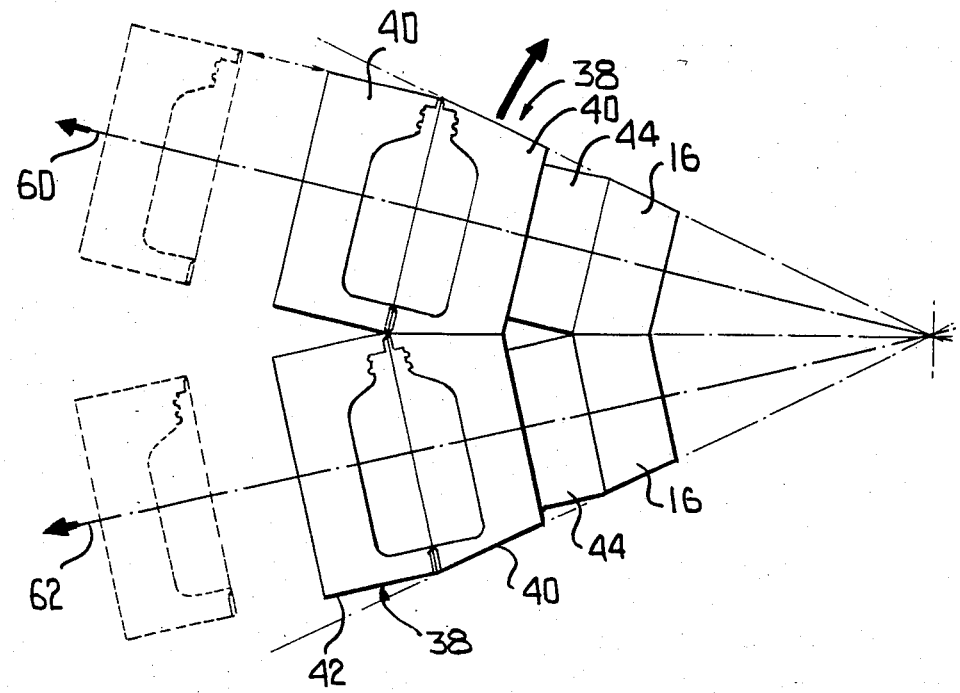
FIG. 1 is a schematic showing of two prior blow molds for forming small containers, and shows generally the mounting thereof and the manner in which the outer mold half of each such blow mold is movable radially outwardly to an open position.

Referring now to the drawings, reference is first made to FIG. 3 wherein there is illustrated a conventional blow molding machine of the Ferris wheel type, the machine being generally identified by the numeral 10 and being generally of the type disclosed in the above described U.S. Pat. No. 2,784,452. The blow molding machine 10 includes a central shaft 12 which carries an inner support structure 14 with there being a fixed inner support 16 for each original set of molds.

The blow molding machine 10 also includes a separate support 18 for each radially inner original mold half with the supports 18 being mounted for guided radial movement on guide rods 20 and being carried by radially outer carriers 22 which are normally radially spaced from the supports 18 by a plurality of removable spacers 24. Each carrier 22 is provided with an inner cam follower 26 which engages a cam track 28 for holding the molds in their closed position. Each carrier 22 is also provided with an outer cam follower 30 for cooperation with an outer cam track 32 for effecting the opening of the molds and the holding of the molds in their open positions.

The blow molding machine 10 normally will be provided with an extrusion head 34 which continuously extrudes a tubular parison 36 which will be gripped between the mold halves and thereafter for introduction thereinto a blowing gas.

Reference is now made to FIG. 1 wherein there is schematically illustrated the mounting of molds for which the machine 10 was originally intended, that is molds being generally identified by the numeral 38 and including an inner mold half 40 and a cooperating mold half 42. It will be seen that each of the inner mold halves 40 is fixedly mounted on an associated support 16 by means of a mounting member 44. Each of the outer mold halves 42 will be secured to the carrier 22 utilizing a mounting block which is not shown, but will be similar to the supports 18 of FIG. 3.

Figure 2:
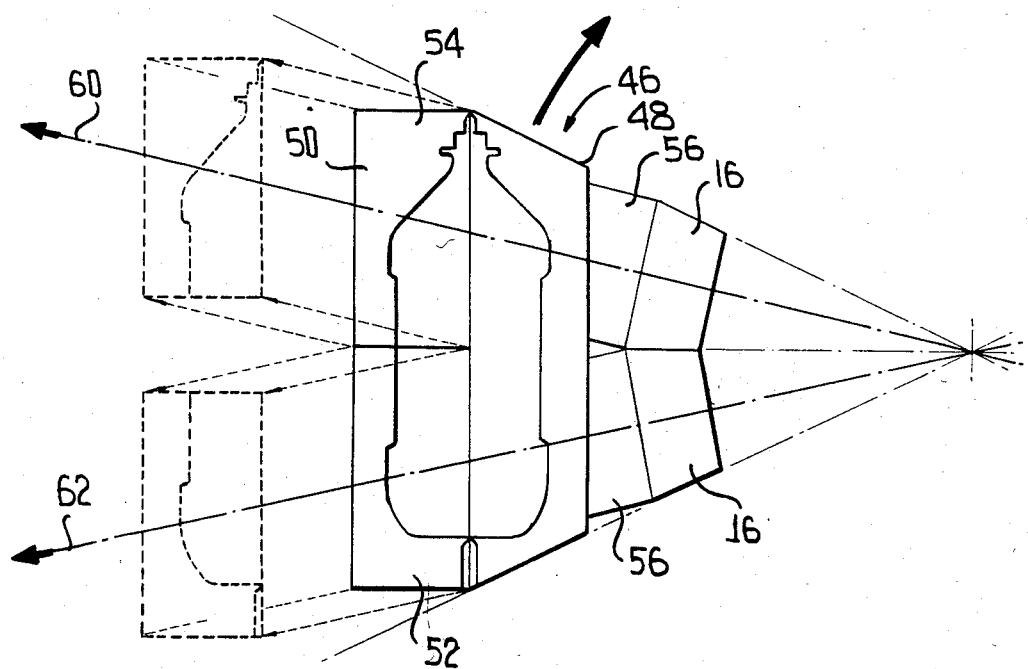
FIG. 2 is a schematic showing similar to FIG. 1, but wherein the two adjacent two-part blow molds previously mounted on a blow molding machine have been replaced by a single three-part blow mold formed in accordance with this invention.

In FIG. 2 there is illustrated a mold which is the subject of this invention and which is identified by the numeral 46. It will be seen that the mold 46 replaces two of the molds 38. The mold 46 includes a radially inner mold half 48 and a radially outer mold half 50, but wherein the radially outer mold half 50 is formed in two axially adjacent segments 52 and 54.

The inner mold half 48 is of a length corresponding generally to the length of two of the mold halves 40 and is fixedly mounted on two of the supports 16 by way of mounting means in the form of two mounting blocks 56 which generally correspond to the mounting blocks 44, but which are of a different configuration due to the shape of the mold half 48.

The outer mold half segments 52, 54 are mounted relative to two adjacent ones of the carriers 22 by mounting means in the form of supports 18 or mounting blocks as is most specifically shown in FIG. 3.

In the intended use of the blow molding machine 10, two adjacent outer mold halves 40, 42 move relative to their fixed mold halves 40 in a radial direction with the mold half 40 moving along a radial axis 60 while the adjacent mold half 42 moves along a different radial axis 62. When the two molds 38 are replaced by the single large capacity mold 46, in the normal operation of the blow molding machine 10 the outer mold half segment 52 will move radially outwardly along the radial axis 62 while the outer mold half segment 54 will move along the axis 60 as shown in FIG. 2. Thus, the mold half segments 52, 54 are movable independent of each other and along divergent axes.

Although all of the opening cam track 32 is not shown in FIG. 3, it is to be understood that the carriers 22 will move radially outwardly in sequence, with the result that after an article, such as a bottle, is blow molded within the mold 46, opening of the mold 46 will be initiated by first beginning the radial outward movement of the outer mold half segment 54, as generally shown at the left of FIG. 3, while the outer mold half segment 52 remains stationary. Then, as the mold 46 moves further circumferentially with the mold half segment 54 continuing its radially outward movement, the radially outward movement of the mold half segment 52 is initiated. Normally, the molded articles, such as the bottle B, will be retained by the mold half segments 52 and after the mold 46 has been fully opened, as is generally shown at the 11:00 o'clock position of FIG. 3, the bottle B will be ejected from the mold half segment 52 and discharged from the machine 10 in the conventional manner.

The mold half segments 52, 54 will move circumferentially in their opened positions until they pass the extrusion head 34, after which the leading outer mold half segment 54 will begin moving radially inwardly due to the engagement of the cam follower 26 with the cam track 28, as shown in the right of FIG. 3. The mold half segment 54 will move to a fully closed position clamping a lower part of the parison 36 relative to the fixed mold half 48, as shown in FIG. 3. Thereafter, the mold half segment 52 will move to its closed position relative to both the fixed mold half 48 and the movable mold half segment 54 to complete the closed blow mold 46. At this time a blowing gas may be introduced into the section of the parison 36 clamped in the blow mold 46 in the normal manner to effect the blow molding of the bottle B or other hollow member for which the blow mold 46 is configurated.

Although only a preferred embodiment of the blow mold and a preferred machine in which the blow mold may be used have been specifically shown and described, it is to be understood that minor variations may be made in the blow mold and its scene of operation without departing from the spirit and scope of the invention as defined by the appended claims.

We claim:

1. A mold particularly adapted for use in a ferris wheel blow molding machine wherein the machine includes a horizontal rotating shaft and a plurality of molds are mounted on said shaft for rotation with said shaft generally in a vertical plane and each mold normally includes a radially fixed radially inner mold half and a radially movable radially outer mold half, said mold comprising a single radially inner radially fixed mold half and two cooperating separately radially movable radially outer mold half segments.

2. A mold according to claim 1 wherein said single radially inner mold half is of an axial dimension to replace two prior radially inner mold halves and includes mounting means for mounting said single radially inner mold half on supports previously provided for two separate radially inner mold halves.

3. A mold according to claim 2 wherein each of said radially outer mold half segments has independent mounting means for separate mounting for independent movement of said segments of said radially outer mold half.

4. A mold according to claim 1 wherein each of said radially outer mold half segments has independent mounting means for separate mounting for independent movement of said segments of said radially outer mold half.

5. A mold according to claim 1 wherein said mold is mounted in a blow molding machine, said blow molding machine comprising a plurality of circumferentially adjacent radially inner radially fixed mold supports and a same plurality of circumferentially adjacent radially movable radially outer mold supports, there being one of said movable mold supports for and radially aligned with each of said fixed mold supports, said radially inner mold half of said mold having mounting means for fixedly mounting the same on and in bridging relation between two adjacent ones of said fixed mold supports, and each of radially outer mold half segments having mounting means separately mounting the same on a respective one of said movable mold supports whereby a single large mold may replace two smaller molds on said blow molding machine.

* * * * *